K. RUSHTON.
STUB END BEARING FOR LOCOMOTIVE RODS.
APPLICATION FILED MAY 12, 1919.
1,328,591. Patented Jan. 20, 1920.
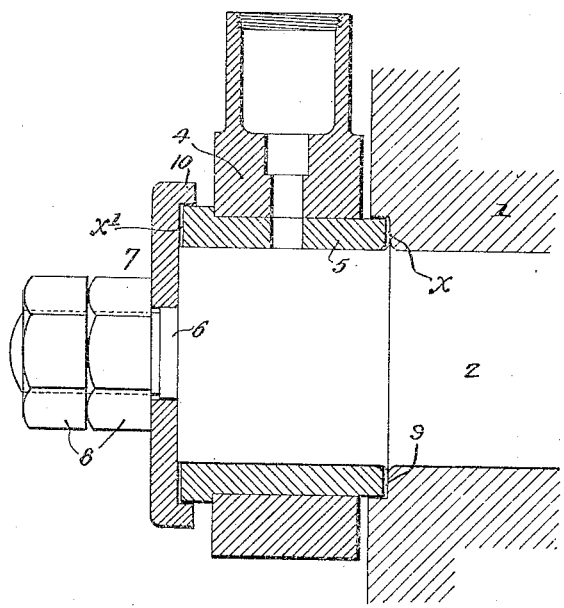
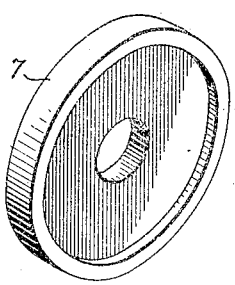
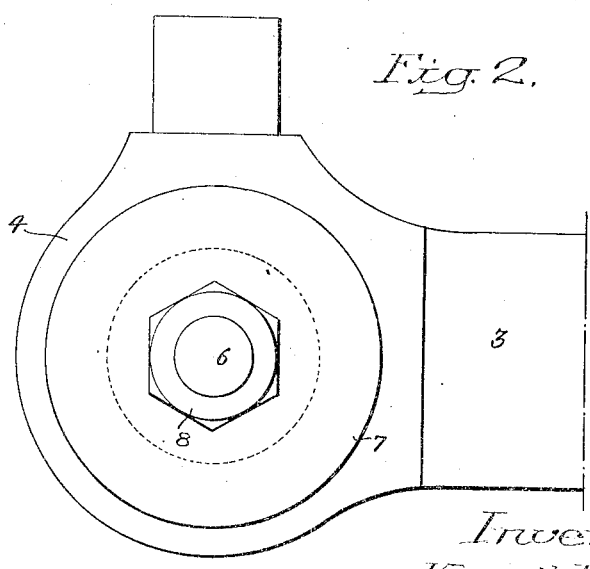
Inventor
Kenneth Rushton
by his Attorneys

UNITED STATES PATENT OFFICE.

KENNETH RUSHTON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

STUB-END BEARING FOR LOCOMOTIVE-RODS.

1,328,591.      Specification of Letters Patent.      Patented Jan. 20, 1920.

Application filed May 12, 1919. Serial No. 296,582.

*To all whom it may concern:*

Be it known that I, KENNETH RUSHTON, a citizen of the United States, residing in Philadelphia, Pennsylvania, have invented certain Improvements in Stub-End Bearings for Locomotive-Rods, of which the following is a specification.

My invention relates to certain improvements in stub end bearings for locomotive rods. In this type of bearing the rod must have a certain clearance at each side in order to prevent heating. These clearance spaces increase in size owing to wear.

The object of my invention is to provide the clearance necessary and at the same time to guard the spaces so as to prevent sand and grit entering the bearing through the spaces and to provide means for retaining lubricant in the spaces.

In the accompanying drawings:

Figure 1 is a sectional view of the hub and bearing of a locomotive;

Fig. 2 is an end view; and

Fig. 3 is a perspective view of the end plate.

1 is the hub of the locomotive driving wheel. 2 is the crank pin secured to the hub in the ordinary manner. 3 is a connecting, or parallel rod of a locomotive having a stud end 4 carrying a bearing 5, which is mounted on the projecting portion of the crank pin 2. This bearing is of less width than the length of the projecting portion of the crank pin. The crank pin has a reduced projection 6 on which is mounted an end plate 7 held to the crank pin by two nuts 8 adapted to the threaded portion of the projection 6. The hub 1 of the wheel is recessed at 9 and the plate 7 has a flange 10. The bearing 5 of the rod extends into the recess 9 of the hub and also into the space surrounded by the flange 10 of the plate 7, but, as stated above, it is of less width than the length of the projecting portion of the crank pin so as to leave clearance spaces $x$, $x'$ at the ends of the bearing. This clearance space is essential in this type of bearing to prevent heating and is increased in service, due to the wear of the parts, Heretofore, the spaces were open so that sand and dirt would accumulate therein and materially increase the wear and would also work between the bearing 4 and the pin, cutting the pin and destroying the efficiency of the bearing. In order to obviate this, I recess the hub, as at 9, so that the end of the bearing 5 will extend into the recess. The flange 10 of the plate provides a recess into which the other end of the bearing extends and while the bearing is free to turn in these two recesses the entrance of sand and dirt is prevented to a great extent. The spaces $x$, $x'$ are practically closed so that the lubricant will accumulate in these spaces and will prevent cutting, making the bearing run more easily than heretofore. The lubricant will prevent any sand or dirt gaining access to the surface between the pin and the bearing.

I claim:

1. The combination in a stub end bearing for locomotive rods, of a wheel; a crank pin projecting therefrom; a flanged plate secured to the outer end of the pin; a rod having a bearing at its end, the width of the bearing being less than the length of the projecting portion of the crank pin so as to leave a clear space between the bearing and the plate, the flange of the plate extending over the bearing so as to inclose the space between the plate and the bearing.

2. The combination in a stub end bearing for locomotive rods, of a wheel; a crank pin projecting from the wheel; an annular recess in the wheel surrounding the pin; a flanged plate secured to the outer end of the pin; a rod; a bearing on the rod mounted on the pin, the bearing extending at one side into the annular recess in the wheel and at the opposite side into the recessed end of the flanged plate, said bearing being less in width than the length of the projecting portion of the pin so as to form a recess at each end.

In witness whereof I affix my signature.

KENNETH RUSHTON.